(12) United States Patent
Reddy et al.

(10) Patent No.: US 11,468,372 B2
(45) Date of Patent: Oct. 11, 2022

(54) DATA MODELING SYSTEMS AND METHODS FOR RISK PROFILING

(71) Applicant: Tata Consultancy Services Limited, Mumbai (IN)

(72) Inventors: Venu Palchuru Reddy, Clive, IA (US); George Nubudem Mokonchu, Linfield, PA (US); Swami Ramamurthi Swaminathan, Edison, NJ (US); Vikas Gopal, Lewis Center, OH (US)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 826 days.

(21) Appl. No.: 15/452,194

(22) Filed: Mar. 7, 2017

(65) Prior Publication Data

US 2017/0262751 A1    Sep. 14, 2017

Related U.S. Application Data

(60) Provisional application No. 62/305,035, filed on Mar. 8, 2016.

(51) Int. Cl.
*G06N 3/02* (2006.01)
*G06Q 10/06* (2012.01)
*G06Q 10/00* (2012.01)

(52) U.S. Cl.
CPC ......... *G06Q 10/00* (2013.01); *G06Q 10/0635* (2013.01); *G06N 3/02* (2013.01)

(58) Field of Classification Search
CPC ........ G06Q 40/08; G06Q 40/06; G06Q 40/00; G06Q 40/04; G06Q 10/0635; G06Q 10/00; G06N 20/00; G06N 5/04; G06N 3/02; G06F 21/577; G06F 16/24578; G06F 16/285; H04L 63/20; H04L 63/1433; H04L 63/102
See application file for complete search history.

(56) References Cited

U.S. PATENT DOCUMENTS

| | | | | |
|---|---|---|---|---|
| 6,119,103 A | * | 9/2000 | Basch | G06Q 20/341 |
| | | | | 705/35 |
| 7,181,450 B2 | * | 2/2007 | Malloy | G06F 16/283 |
| 7,756,907 B2 | * | 7/2010 | Stolte | G06F 16/211 |
| | | | | 707/805 |
| 2004/0034616 A1 | * | 2/2004 | Witkowski | G06F 16/283 |
| 2005/0149459 A1 | * | 7/2005 | Kofman | G06N 7/026 |
| | | | | 706/2 |

(Continued)

OTHER PUBLICATIONS

Dittenbach et al., "The Growing Hierarchical Self-Organizing Map," Jul. 2000, Proceedings of the International Joint Conference on Neural Networks, 5 pages (Year: 2000).*

(Continued)

*Primary Examiner* — Hal Schnee
(74) *Attorney, Agent, or Firm* — Finnegan, Henderson, Farabow, Garrett & Dunner, LLP

(57) ABSTRACT

A processor-implemented method for generating a multi-dimensional risk profiling data structure includes identifying one or more dimensions common to a plurality of risks along which all of the plurality of risks may be aggregated, assigning the one or more common dimensions to a top level cube structure, identifying a set of dimensions and risk drivers specific to each of the plurality of risks, and assigning each set of dimensions and risk drivers to each of a plurality of second level cubes.

4 Claims, 7 Drawing Sheets

(56) References Cited

U.S. PATENT DOCUMENTS

2010/0235300 A1\* 9/2010 Feingold ................ G06Q 40/06 705/36 R
2012/0259758 A1\* 10/2012 Tunney .................. G06Q 40/04 705/37
2015/0317058 A1\* 11/2015 Babarykin .......... G06F 3/04842 715/765
2016/0371618 A1\* 12/2016 Leidner .............. G06Q 10/0635
2017/0109678 A1\* 4/2017 Chu ..................... G06Q 10/063

OTHER PUBLICATIONS

Kiviluoto, "Predicting bankruptcies with the self-organizing map," 1998, Neurocomputing 21, pp. 191-201 (Year: 1998).\*

Tingdahl et al., "Semi-automatic detection of faults in 3D seismic data," 2005, Geophysical Prospecting, 53, pp. 533-542 (Year: 2005).\*

Zheng et al., "Multi-Attributes and Neural Network-Based Fault Detection in 3D Seismic Interpretation," 2014, Advanced Materials Research vols. 838-841, pp. 1497-1502 (Year: 2014).\*

Abdelbaki, Wiem, Sadok Ben Yahia, and Riadh Ben Messaoud. "Modular neural networks for extending OLAP to prediction." Transactions on Large-Scale Data-and Knowledge-Centered Systems XXI. Springer, Berlin, Heidelberg, 2015. 73-93. (Year: 2015).\*

\* cited by examiner

| Risk Type (Discriminating) Dimension ⸓44 ||
|---|---|
| Parent | Child |
| All Risks | Liability Risks |
| Liability Risks | Reserve Risk |
| Liability Risks | Premium Risk |
| All Risks | Asset Risks |
| Asset Risks | Market Risk |
| Asset Risks | Credit Risk |

| Parent Cube (Risk Type) ⸓46 ||
|---|---|
| Parent | Child |
| All Risks | Liability Risks |
| All Risks | Asset Risks |

Product (Discriminating) Dimension

| Product | Product Class | Target Demographic | All Products |
|---|---|---|---|
| Liability Only | Auto | Used Car Owners | All |
| Premium Coverage | Auto | Premium Car Owners | All |
| Signature | Home | High Credit Score | All |

FIG. 8

Parent Cube (Product)

| Target | All Products |
|---|---|
| Used Car Owners | All |
| Premium Car | All |
| High Credit Score | All |

FIG. 9

Child Cubes (Product)

| Product | Product Class | Child Cubes |
|---|---|---|
| Liability Only | Auto | Auto Cube |
| Premium | Auto | Auto Cube |
| Signature | Home | Home Cube |

FIG. 10

DATA MODELING SYSTEMS AND METHODS FOR RISK PROFILING

TECHNICAL FIELD

This disclosure relates generally to data modeling, and more particularly to data modeling systems and methods for risk profiling.

BACKGROUND

Organizations in a variety of industries seek to understand and quantify various types of risks faced by the organization. For example, an insurance provider in the insurance industry may seek to understand the risks associated with offering a particular individual a life, home, or auto insurance policy. Many current platforms for evaluating risk examine a variety of types of risks. Such platforms may assign a numerical quantity to each risk type and then aggregate the numerical quantities to reach a quantitative aggregate measure of a particular risk associated, for example, with a particular transaction, such as the issuance of an insurance policy. However, such platforms produce only a single number indicative of risk. If greater understanding of the multiple and often interdependent factors contributing to the aggregated risk is desired, a user may need to manually navigate separate data structures. Thus, traditional risk profiling methods burden the user with the need to manually examine separate data structures to gain greater understanding of the multiple factors driving the overall risk profile. Accordingly, there exists a need for systems and methods that address these drawbacks.

SUMMARY

In one embodiment, a processor-implemented method for generating a data structure for multi-dimensional risk profiling includes facilitating the identification of one or more dimensions that are common to a plurality of risks and along which all of the plurality of risks may be aggregated, assigning the one or more common dimensions to a top level cube structure, facilitating the identification of a set of dimensions and risk drivers specific to each of the plurality of risks, assigning each set of dimensions and risk drivers to each of a plurality of second level cubes, and enabling end user analyses of such risks by risk specific drivers while allowing viewing of aggregated risks by common dimensions.

In another embodiment, a data structure includes a tangible, non-transitory, computer-readable medium storing instructions that, when executed by a processor, cause the processor to perform a method including facilitating the identification of one or more dimensions common to a plurality of risks along which all of the plurality of risks may be aggregated, assigning the one or more common dimensions to a top level cube structure, facilitating the identification of a set of dimensions and risk drivers specific to each of the plurality of risks, assigning each set of dimensions and risk drivers to each of a plurality of second level cubes, and enabling end user analyses of such risks by risk specific drivers while allowing viewing of aggregated risks by common risk dimensions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8 is a product dimension table in accordance with some embodiments of the present disclosure.

FIG. 9 is a parent cube table in accordance with some embodiments of the present disclosure.

FIG. 10 is a child cube table in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Provided herein are risk profiling systems, methods, and data structures that enable a user to examine and evaluate the risks faced by an organization from multiple sources and at multiple levels of the organization for a combination of risk drivers from multiple aspects relevant to the particular type of business and the risks inherent in that type of business. More particularly, the disclosed data models for risk profiling accommodate a combination of risk drivers based on the organization, product and risk types. Further, the data models enable the risk indicators for each of the risk types to be captured by incorporating separate, multi-dimensional cubes with potentially different dimensionality within a single risk measure.

Since the total risk is an aggregation of multiple risk types, and each risk type may have a different set of risk drivers, embodiments of the risk profiling methods disclosed herein may include identifying the common dimensions (or portions of dimensions) along which all the risks may be aggregated. The foregoing feature enables each risk type to have a unique set of dimensions and risk drivers, which may then be aggregated to a common cube with a common set of dimensions. In some embodiments, the risk measures may have a number of dimensions, each of which is relevant depending on the level of aggregation and current selection in other dimensions (e.g., product dimension may be relevant for only liability/insurance risks, but not other types of risks). In order to achieve the foregoing features, one or more risk measures may be recursively defined as a hierarchical set of cubes, as described in more detail below.

Figure 1:
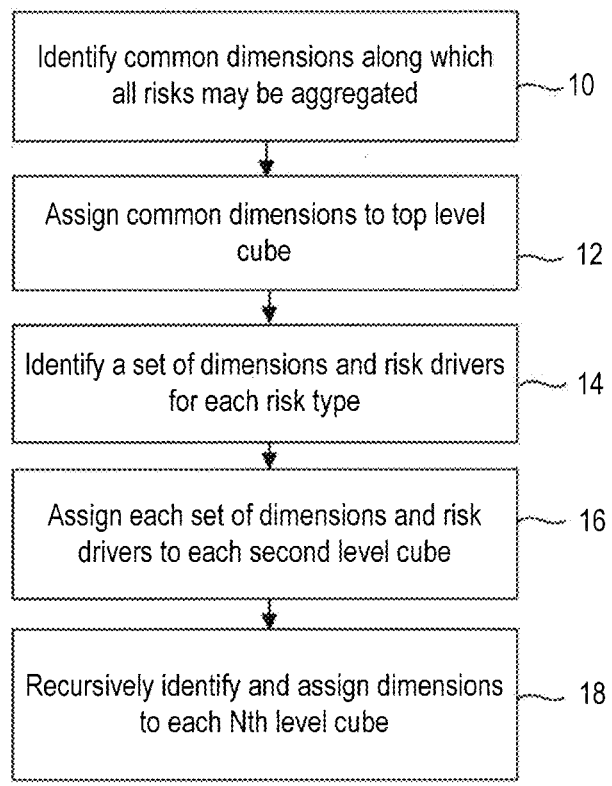
FIG. 1 illustrates an exemplary method for generating a hierarchical risk profiling data structure according to some embodiments of the present disclosure.
Figure 2:
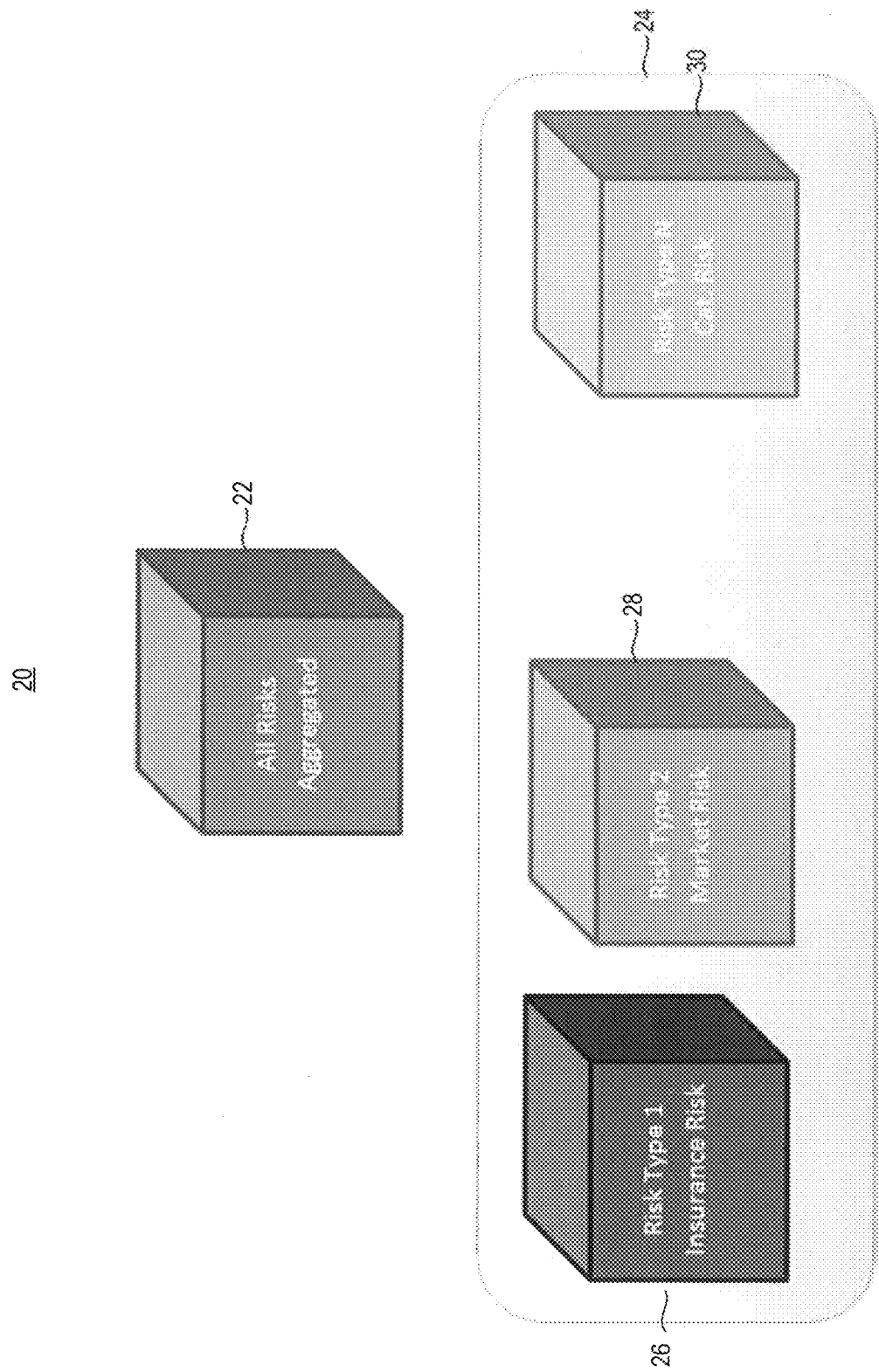
FIG. 2 is a schematic illustrating an exemplary hierarchical risk profiling data structure that may be generated in accordance with the method of FIG. 1 according to some embodiments of the present disclosure.

Turning now to the drawings, FIG. 1 is a flow diagram illustrating a method 8 for generating a hierarchical risk profiling data structure in accordance with an embodiment. FIG. 2 schematically illustrates an example of a data structure 20 that may be generated by implementing the method 8 of FIG. 1. As shown in FIG. 1, the method 8 includes identifying common dimensions along which all of a plurality of risks may be aggregated (block 10). As used herein, dimensions may refer to aspects of the organization used to collect and analyze data and/or information. For example, dimensions may be geography, product, customer, organization, etc. In some embodiments, dimensions may be orthogonal such that selecting a specific member of a set does not affect the members of other sets.

Further, in some embodiments, members of dimensions may be organized into tree structures used to facilitate data aggregation and navigation during data analysis. In such a structure, the data at the members of a parent level may be obtained by aggregation of the corresponding child members, and child members may be navigated to from the corresponding parent members during an analysis. The tree structure may be pre-defined (e.g., at the configuration time) by defining parent-child relationships between members such that the relationships are one (parent) to many (children).

Once the common dimensions are identified, the method 8 (as in FIG. 1) proceeds by, assigning the common dimensions to a top level cube (block 12), such as cube 22 in FIG. 2. As used herein, a cube may be a data structure having a defined dimensionality. In some embodiments, cubes may represent physical tables and/or facts in a multi-dimensional manner. In some implementations, multiple cubes with the same dimensionality may be combined into a single fact table, for example, for storage. For example, volume and revenue may be stored in one cube with dimensionality of geography, customer, product, and time, whereas price may be stored in a separate cube with dimensionality of product, geography, and time (e.g., independent of the customer dimension).

By assigning common dimensions to higher level cubes (e.g., by assigning common dimensions to aggregated cube 22), the data models disclosed herein may enable a user to gain a deeper level of understanding of the aggregated risk. For example, while top level cubes (e.g., cube 22) may include common dimensions, lower level cubes may include a superset of dimensions specific to each type of risk. To that end, the method 8 further includes identifying a set of dimensions and risk drivers for each risk type (block 14 as in FIG. 1) and assigning each set of dimensions and risk drivers to each second level cube (block 16), for the identified common dimensions. For example, each of cubes 26 and 28 in second level 24 of FIG. 2 may be assigned a set of dimensions and risk drivers specific to the given risk type embodied in the cube. For instance, cube 26 associated with insurance risk may be assigned dimensions and risk drivers relevant to insurance risk, and those dimensions and risk drivers may or may not overlap with the dimensions and risk drivers assigned to cube 28 associated with market risk. In a similar manner, each of N cubes 30 can be assigned dimensions and risk drivers specific to that risk.

The method 8 further includes recursively identifying and assigning dimensions to each of Nth level cubes (block 18) to form a multi-level hierarchical structure. That is, while FIG. 2 illustrates only two levels of the hierarchical structure for example, the data structure 20 may include any desired number of hierarchical cubes, depending on implementation-specific considerations.

FIGS. 3-10 illustrate one example implementation of the risk profiling data modeling in the context of insurance risks. However, this context is presented for illustration only. Indeed, the data modeling disclosed herein is applicable to a wide variety of industries, such as financial and non-financial industries.

Figures 3, 4, 5:
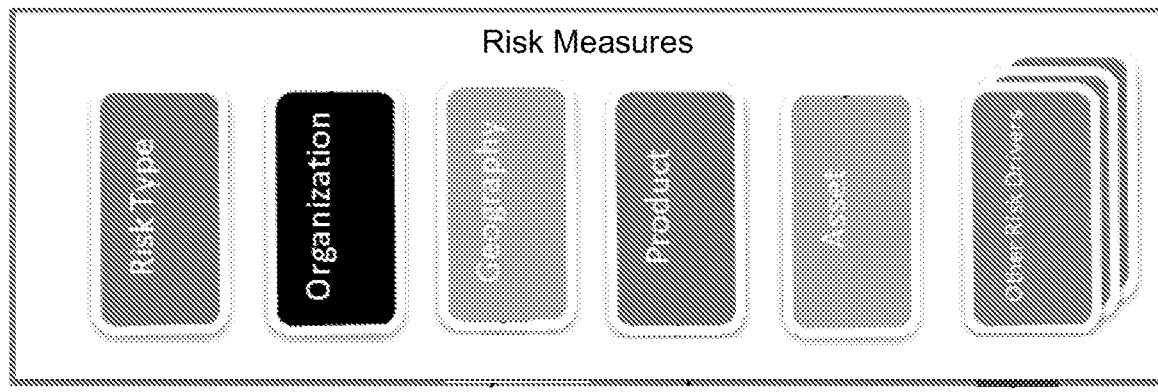
FIG. 3 is a schematic illustrating a plurality of dimensions for a risk measure in accordance with some embodiments of the present disclosure.
FIG. 4 is a risk type dimension table according to some embodiments of the present disclosure.
FIG. 5 is a parent cube table in accordance with some embodiments of the present disclosure.

FIG. 3 can support a plurality of risk measures, including Economic Capital, Solvency Capital Requirement, etc. As used herein, risk measures may refer to a logical set of data representing a business and/or performance indicator. In traditional data modeling, a measure, such as a risk measure, may be assumed to have one set of dimensions influencing its values. However, the data models presented herein may enable multiple dimensions influencing a measure's value to be accounted for and analyzed without the need for separate data structures. Thus, in some embodiments, risk measures may be defined to have multiple dimensions, each of which is relevant depending on the level of aggregation and current selection in other dimensions (e.g., product dimension 38 may be relevant only for liability or insurance risks).

In such a data structure, one dimension may become the discriminating dimension that is partitioned between the higher level cube (e.g., cube 22) and the set of lower level cubes (e.g., cubes 26, 28, and 30). In some embodiments, if the discriminating dimension is defined as a tree, non-overlapping subtrees of the dimension tree may be identified, and one such subtree may be used in each of the lower level cubes. In some embodiments, every path from the root of the dimension leads to one subtree that is used in a lower level cube. The remaining tree becomes part of the higher level cube such that roots of the subtrees can be aggregated to compute the higher level cube.

In other embodiments, if the discriminating dimension is defined as a set of attributes that are dynamically used to form aggregation trees, values of one of the attributes may be used to create the cube hierarchy. The remaining attribute of the discriminating dimension may then be partitioned between the parent and child cubes (i.e., all child cubes use the same attributes but the values are partitioned).

FIGS. 4 and 5 illustrate an example of the discriminating dimension in a risk type 44 table and a parent cube table 46. In the illustrated embodiment, the child cubes will have one each of the following single node subtrees: reserve risk, premium risk, market risk and credit risk, as shown in table 44. The parent cube may aggregate all the risks and break down into the following child nodes: liability risks and asset risks, as shown in table 46.

Figure 6:
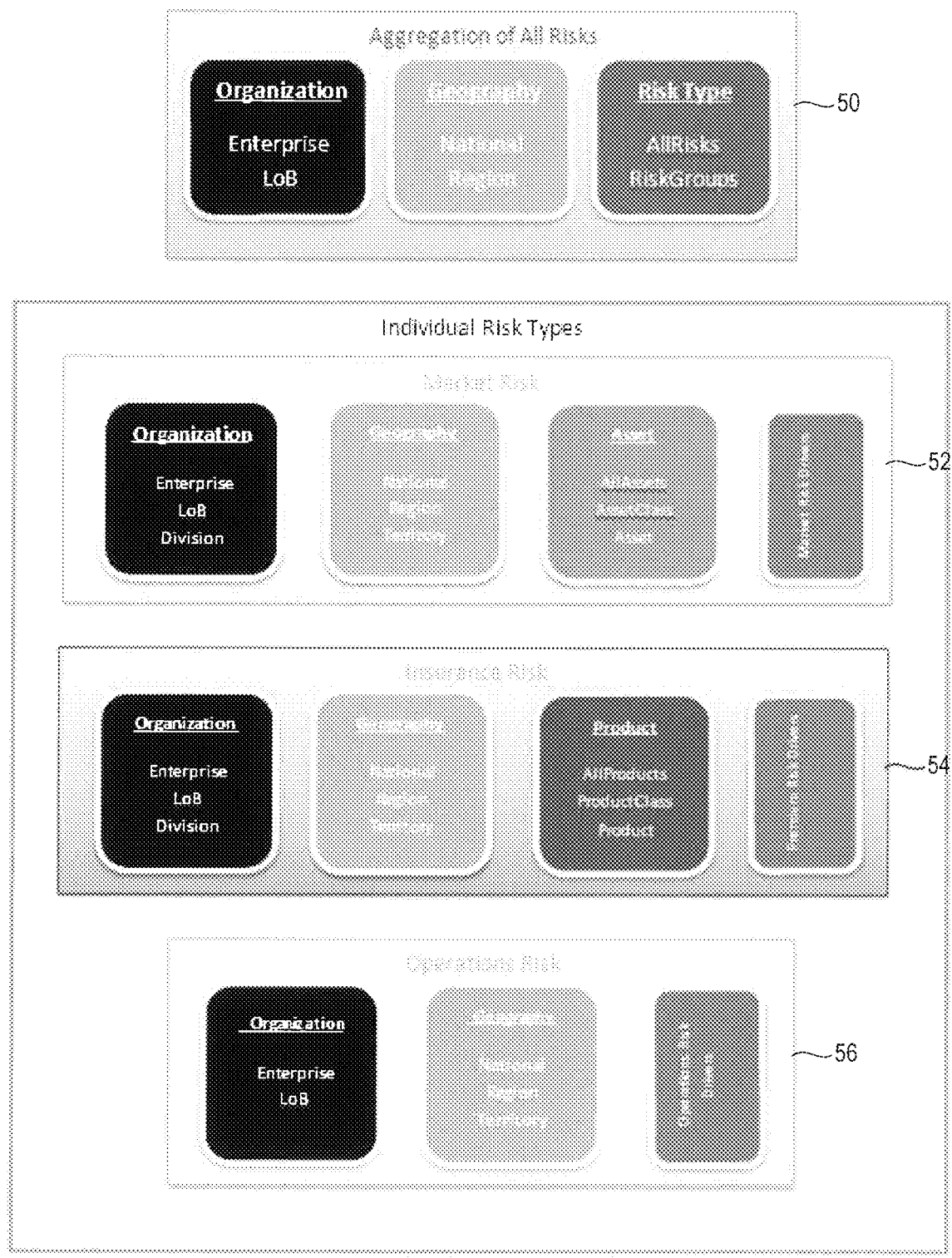
FIG. 6 is a schematic illustrating risk aggregation and risk types in accordance with some embodiments of the present disclosure.

FIG. 6 illustrates one example of the hierarchical cube structure based on dimensions and risk types in more detail. In this embodiment, if all the risks in an enterprise, such as market risk 52, insurance risk 54, and operations risk 56, can be broken down by organization and geography, the risk measures can be organized into multiple cubes recursively.

In such an arrangement, as shown in FIG. 6, one aggregated cube 50 may hold the aggregated risks structured by the common dimensions of organization, geography, and risk type. One cube for each of market risk 52, insurance risk 54, and operations risk 56 (which may themselves be recursively defined) may be structured by the common dimensions as well as the risk drivers and dimensions specific to that risk type. In some embodiments, since each component cube may be implicitly associated with one risk type, the risk type dimension may not be explicitly represented in those cubes unless those risk types are further broken down into risk factors.

Additionally, each dimension (other than the discriminating dimension) of the aggregated cube 50 may be a subset of the corresponding dimension, both in terms of the attributes and their values, in each of the individual risk cubes 52, 54, and 56. Thus, in the example illustrated in FIG. 6, the organization dimension in the aggregated risk cube 50 is Enterprise—LoB, which is a subset of the organization dimension in all component cubes 52, 54, and 56. The same structure may apply to the geography dimension.

Furthermore, in some embodiments, the additional (non-common) dimensions of each of the component cubes 52, 54, and 56 may be aggregated to or computed at a single point. In certain embodiments, this may utilize an attribute with a single member, which can be used to run the computation models. Thus, the additional dimensions (e.g., asset in case of market risk, and product in case of insurance risk) may each have one attribute with one member: all products for product dimension and all assets for asset dimension. The same structure may apply to all the risk specific drivers.

When the foregoing data model is implemented, as a user navigates from aggregated risk to individual risk types, the corresponding cube is accessed, and the additional dimensions and/or risk drivers become available for navigation. Similarly, when risk indicators are aggregated from individual component cubes to groups of risks, data is stored in the aggregate cube under the appropriate risk group.

Figure 7:
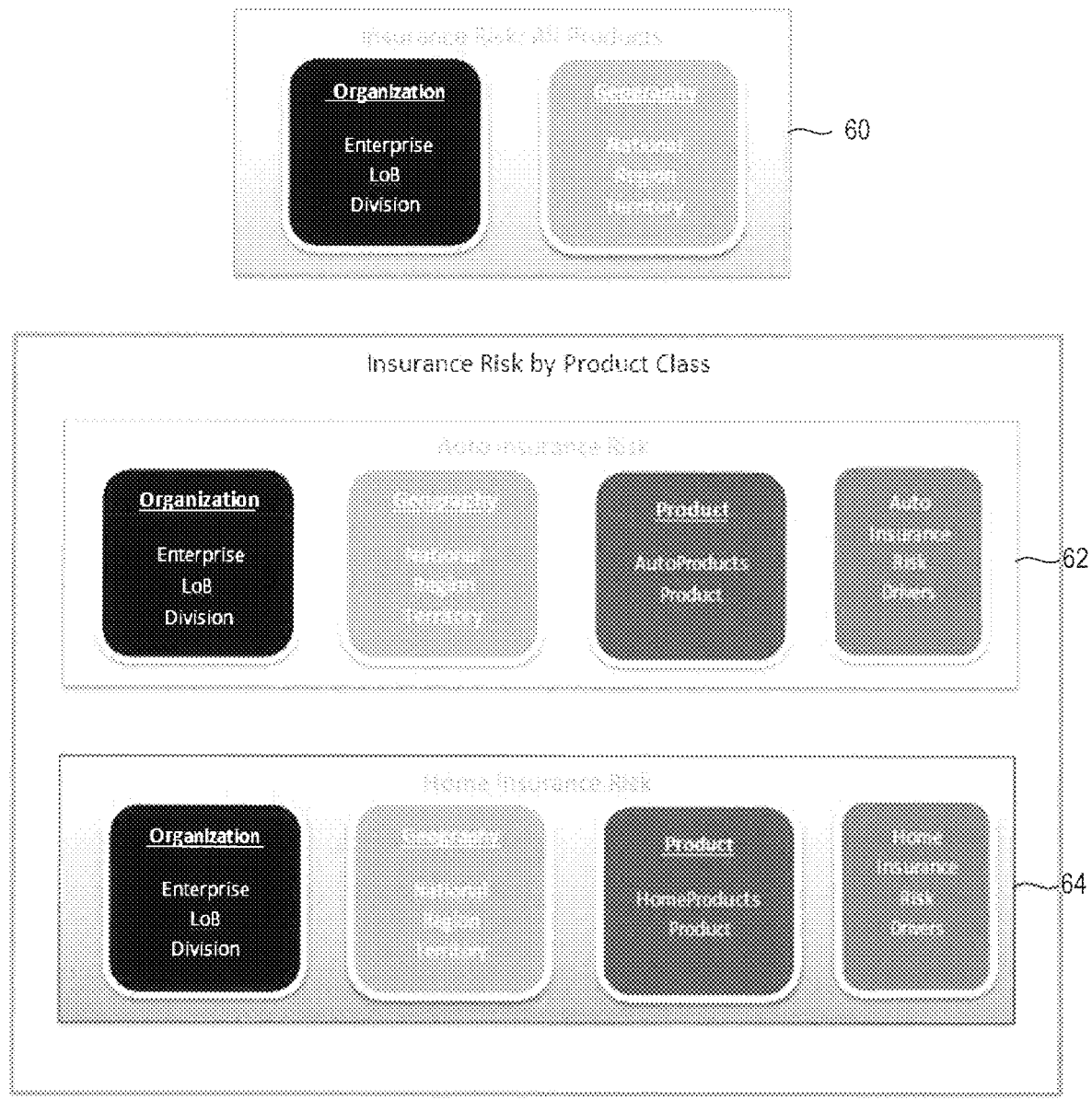
FIG. 7 is a schematic illustrating insurance risk and insurance risk by product class in accordance with some embodiments of the present disclosure.

As illustrated in FIG. 7, in the example embodiment, insurance/liability risk has different risk drivers for each class of products. Therefore, the insurance risk cube 60 may be defined recursively using the product dimension to discriminate between aggregated and component cubes, as shown in table 66 of FIG. 8. Further, the parent and child cubes may be defined as shown in table 68 of FIG. 9 and table 70 of FIG. 10, using the product class attribute such that each member of that attribute (e.g., auto, home, etc.) has a different component cube.

Thus, in this embodiment, the aggregated cube 60 is configured to hold the aggregated risks across all products structured by the common dimensions of organization and geography. The product dimension is not represented in FIG. 7 since the cube stands for an aggregation of all products without any break down in product dimension. Further, each of the product classes is assigned a cube, such as an auto insurance risk cube 62 and a home insurance risk cube 64. The cubes 62 and 64 are structured by the common dimensions, as well as the risk drivers and dimensions specific to the given product class. For example, for auto insurance risk cube 62, driving habits, driver age, vehicle type, etc. may be specific to this product class. For further example, for the home insurance risk cube 64, construction type, age of the home, etc. may be specific to this product class.

Figure 11:
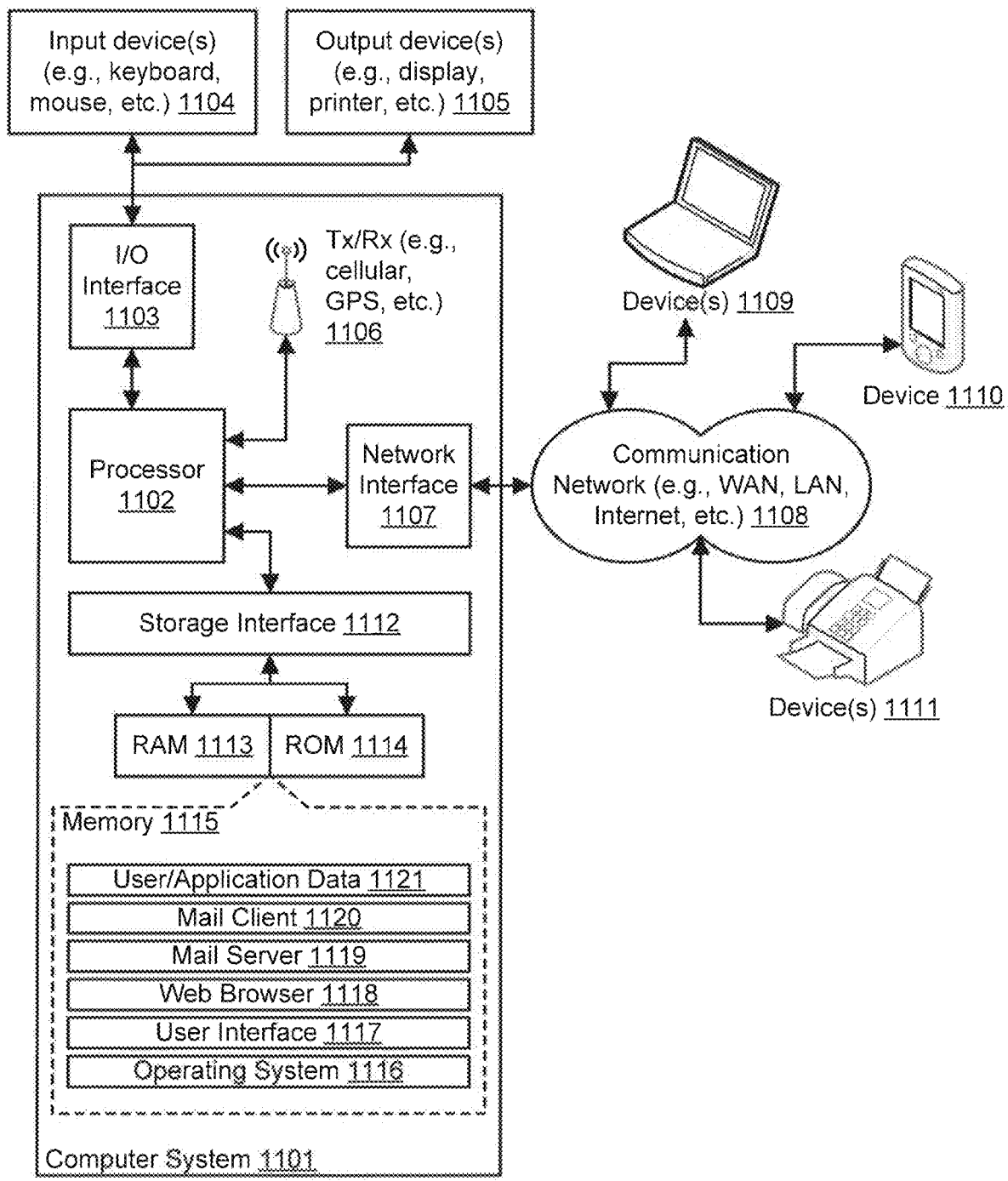
FIG. 11 is a block diagram illustrating an exemplary system for implementing the disclosed risk profiling methods in accordance with some embodiments of the present disclosure.

FIG. 11 is a block diagram of an exemplary computer system for implementing embodiments consistent with the present disclosure. Variations of computer system 1101 may be used for implementing one or more of the methods disclosed herein. Computer system 1101 may comprise a central processing unit ("CPU" or "processor") 1102. Processor 1102 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1102 may be disposed in communication with one or more input/output (I/O) devices via I/O interlace 1103. The I/O interface 1103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1105 may be a printer, fax machine, video display (e.g., cathode ray tube (CRT), liquid crystal display (LCD), light-emitting diode (LED), plasma, or the like), audio speaker, etc.

In some embodiments, the output device 1105 may include a user interface configured to display one or more of the hierarchical cube data models disclosed herein. For example, the user interface may display a series of hierarchical cubes, such as cubes 22, 26, 28, and 30 shown in FIG. 2. In other embodiments, the multi-dimensionality of the hierarchical cubes may be displayed in another manner. For example, at each level of the hierarchical data structure, pie charts or dropdown menus may enable a user to explore and analyze the multiple dimensions and risk drivers at each hierarchical level. The foregoing features may provide end users a unified view of multiple risk types with specific risk influencers, facilitate the use of risk measures in strategic decision making by having all the relevant data in one place, and enable support of multiple domains.

In some embodiments, a transceiver 1106 may be disposed in connection with the processor 1102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1108 via a network interface 1107. The network interface 1107 may communicate with the communication network 1108. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1108 may include, without limitation, a direct interconnection, local area network (LAN), wide area network (WAN), wireless network (e.g., using Wireless Application Protocol), the Internet, etc. Using the network interface 1107 and the communication network 1108, the computer system 1101 may communicate with devices 1110, 1111, and 1112. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 01 may itself embody one or more of these devices.

In some embodiments, the processor 1102 may be disposed in communication with one or more memory devices (e.g., RAM 1113, ROM 1114, etc.) via a storage interface 1112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for storing, for example, programs corresponding to the methods disclosed herein and/or outputs of the methods provided herein.

The memory devices may store a collection of program or database components, including, without limitation, an operating system 1116, user interface application 1117, web browser 1118, mail server 1119, mail client 1120, user/application data 1121 (e.g., any data variables or data records discussed in this disclosure), etc. The operating system 1116 may facilitate resource management and operation of the computer system 1101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1117 may facilitate display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1101 may implement a web browser 1118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1101 may implement a mail server 1119 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1101 may implement a mail client 1120 stored program component. The mail client may be a mail viewing application, such as Apple Mail, Microsoft Entourage, Microsoft Outlook, Mozilla Thunderbird, etc.

In some embodiments, computer system 1101 may store user/application data 1121, such as the data, variables, records, etc. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

In some embodiments, execution of the sequences of instructions may be performed by a single computer system. In other embodiments, two or more computer systems may be coupled to perform the sequence of instructions in coordination with one another. The illustrated system may transmit and receive messages, data, and instructions, including program code (i.e., application code) through, for example, input device 1104. Received program code may be executed by processor 1102 as it is received, and/or stored in a disk drive, or other non-volatile storage for later execution. Additionally, in the same embodiments or other embodiments, the server, messaging and instructions transmitted or received may emanate from hardware, including operating system, and program code (i.e., application code) residing in a cloud implementation.

In an embodiment, the risk profiling data structure is generated using a neural network, by creating a neural network computational model for data collected for risk profiling, training the neural network computational model using the data collected for risk profiling, and validating the neural network computation model for generating a risk profiling data structure.

Further, it should be noted that one or more of the systems and methods provided herein may be suitable for cloud-based implementation. For example, in some embodiments, some or all of the data used in the disclosed methods may be sourced from or stored on any cloud computing platform.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for generating a hierarchical multi-dimensional risk profiling data structure for enabling a user to examine and evaluate risks faced by an organization from multiple sources and at multiple levels of the organization, comprising:
    identifying one or more parent dimensions along which a plurality of risks being profiled is aggregated, wherein the one or more parent dimensions are common dimensions of an aggregated risk, and wherein the one or more parent dimensions are at least one of a geography, a product, a customer and the organization;
    assigning the one or more parent dimensions to a top level cube structure;
    identifying a set of child dimensions and risk drivers specific to each of the one or more parent dimensions of the plurality of risks, wherein the set of child dimensions are a superset of each of the one or more parent dimensions specific to each type of risk;
    creating a discriminating dimension from the one or more parent dimension and the set of child dimensions, wherein the discriminating dimension is one or more sets of attributes to dynamically form one or more aggregation trees, and the value of at least one of the one or more sets of attributes creates a cube hierarchy and at least one remaining attribute from the one or more set of attributes is partitioned between the one or more parent dimensions and the set of child dimensions;
    and
    assigning the set of child dimensions and risk drivers to each of a plurality of second level cubes, wherein the risk profiling data structure is generated using a neural network, by:
        creating a neural network computational model for data collected for risk profiling;
        training the neural network computational model using the data collected for risk profiling;
        validating the neural network computation model for generating a risk profiling data structure, wherein in the generated risk profiling data structure, data of the one or more parent dimensions are obtained by aggregation of the corresponding set of child dimensions and each of the set of child dimensions are navigated to from the corresponding one or more parent dimensions during a data analysis; and
    providing a unified view of the risk profiling structure, wherein the risk profiling structure includes a plurality of risk types with specific risk influencers.

2. The processor-implemented method of claim 1, further comprising recursively identifying and assigning an Nth set of dimensions and risk drivers to each of Nth level cubes.

3. A hierarchical multi-dimensional risk profiling system for enabling a user to examine and evaluate the risks faced by an organization from multiple sources and at multiple levels of the organization, comprising:
    a tangible, non-transitory, computer-readable medium storing instructions that, when executed by a processor, cause the processor to perform a method comprising:
        identifying one or more dimensions along which a plurality of risks being profiled is aggregated, wherein the one or more parent dimensions are common dimensions of an aggregated risk, and wherein the one or more parent dimensions are at least one of a geography, a product, a customer and the organization;
        assigning the one or more parent dimensions to a top level cube structure;
        identifying a set of child dimensions and risk drivers specific to each of the one or more parent dimensions of the plurality of risks, wherein the set of child dimensions are a superset of each of the one or more parent dimensions specific to each type of risk;
        creating a discriminating dimension from the one or more parent dimension and the set of child dimensions, wherein the discriminating dimension is one or more sets of attributes to dynamically form one or more aggregation trees, and the value of at least one of the one or more sets of attributes creates a cube hierarchy and at least one remaining attribute from the one or more set of attributes is partitioned between the one or more parent dimensions and the set of child dimensions;
        and
        assigning the set of child dimensions and risk drivers to each of a plurality of second level cubes,
    wherein the risk profiling data structure is generated using a neural network, by:
        creating a neural network computational model for data collected for risk profiling;

training the neural network computational model using the data collected for risk profiling;

validating the neural network computation model for generating a risk profiling data structure, wherein in the generated risk profiling data structure, data of the one or more parent dimensions are obtained by aggregation of the corresponding set of child dimensions and each of the set of child dimensions are navigated to from the corresponding one or more parent dimensions during a data analysis; and providing a unified view of the risk profiling structure, wherein the risk profiling structure includes a plurality of risk types with specific risk influencers.

4. The system, of claim 3, further comprising recursively identifying and assigning an Nth set of dimensions and risk drivers to each of Nth level cubes.

* * * * *